Patented May 12, 1936

2,040,314

UNITED STATES PATENT OFFICE 2,040,314

TREATMENT OF RUBBER

Archie R. Kemp, Westwood, N. J., assignor to Bell Telephone Laboratories, Incorporated, New York, N. Y., a corporation of New York No Drawing. Application April 3, 1934, Serial No. 718,787

3 Claims. (Cl. 18—50)

The present invention relates to methods of treating rubber to produce a purified rubber suitable for submarine cable insulation when compounded with other substances or when used alone in vulcanized form and for other analogous purposes.

In a prior patent specification of the applicant it was proposed to treat rubber latex preserved with ammonia with an excess of water under a steam pressure of about fifty pounds per square inch more or less and thereafter coagulate the rubber with acetic acid and wash the coagulum thoroughly for the purpose of producing a substance suitable for use as a constituent of a high grade submarine cable insulation of superior electrical and mechanical properties.

It was also proposed to treat sheet rubber with an excess quantity of water under about fifty pounds steam pressure, more or less, for a considerable number of hours for the purpose of producing a product which after washing would have similar properties.

Furthermore, it has been proposed to treat either sheet rubber or latex with caustic alkalis in proportion of about ½ to 2 per cent of the total volume of material under treatment in the case of latex and about ½ to 2 per cent of the amount of water used in the case of sheet rubber.

Each of the above methods has its beneficial aspects and each of them can be performed with a successful and commercially useful resultant product.

Each of them, however, has some appreciable disadvantage which might beneficially be eliminated. In the case of treating latex with water it is at once obvious that latex is less readily available than commercial rubber owing to the cost of preserving and shipping it. Although available at times in considerable quantities it is not so easily obtained in large quantities as is commercial rubber itself. In treating sheet rubber with water the product has generally been a trifle inferior to that obtained by treating latex, more particularly with respect to its mechanical properties. In those processes involving an addition of caustic alkalis some difficulty has been encountered in removing the last traces of the alkali and in the case of the very best submarine cable insulation it is quite necessary that this be done.

In accordance with the present invention the raw material employed is crude rubber in sheet form such as is available on the market in large quantities and a process is used which is very effective and at the same time leaves no residue of salts, alkalis or similar substances in the rubber. In carrying out the process in a preferred manner thin pale plantation crepe is made into a loose roll or stack and covered in a containing vessel or in an autoclave with about three times its weight, more or less, of concentrated ammonium hydroxide. The containing vessel is preferably made of a noncorrosive material such as a commercial grade of stainless steel. The material is then treated in an autoclave or the vessel containing the material is put into an autoclave. The temperature is elevated to about 300° F. (approximately 150° C.), which corresponds to about fifty pounds, steam pressure per square inch for about two hours after which the treated rubber is removed and washed and the ammonia removed by steam distillation.

In referring to concentrated ammonium hydroxide herein reference is made to a very strong solution having a specific gravity of about 0.894 at 25° C. and containing about 28 to 29 per cent $NH_3$. This is to be distinguished from the small amount of ammonia employed in previous processes for treating latex which is merely that commonly used for preserving latex, i. e., about 1 per cent. This relatively great concentration of the ammonia solution employed is considered to make the process entirely different from the processes previously employed in which latex preserved with about 1 per cent of ammonia is diluted with about four to five parts water and then treated under steam pressure because in those cases the ammonia concentration in the solution is so small that it is not believed to have any important function in the reactions which take place during the treatment.

It is believed that the present process is quite effective in converting the protein constituents of the rubber to readily removable substances because analyses indicate that 90 per cent or more of the nitrogen is taken out of the rubber and furthermore, the ammonia solution employed in the process, after the rubber has been treated and removed therefrom, gives a very definite protein reaction when examined by the methods of testing usually employed.

The rubber product obtained by the present method has electrical properties much more suitable for use as insulation after long immersion in sea water than does similar untreated rubber. It is also more stable and hence more useful as a high grade deep sea cable insulation.

For the purpose of testing the electrical properties there were prepared samples of crepe rubber treated for two hours at about 110° C. in concentrated ammonium hydroxide solution;

other samples were similarly treated at 150° C. for about two hours and other samples not treated at all. From each of these samples test sheets were made. All of these test sheets were made by compounding one hundred parts rubber and one part of zinc oxide, three-fourths part of sulphur, one part of thionex (tetra-methyl-thiuram-monosulphide), one-fifth part of an accelerator (di-phenylguanidine) and two parts of an anti-oxidant (phenol-alpha-naphthylamine). These sheets were then vulcanized at 258° F. (125° C. approximately). It was found that the sheets made from the rubber treated with concentrated ammonia solution cured or vulcanized more rapidly than those made from the untreated rubber and consequently they were cured only twenty-five minutes whereas the untreated rubber required thirty-five minutes. It was also found that sheets made from the treated rubber had a somewhat higher tensile strength and a somewhat greater elongation than those made from the untreated rubber. The sheets were then immersed in a 3.5 per cent solution of sodium chloride and kept in the dark at room temperature. After 35 and 118 days' immersion they were removed and tested for their electrical properties at 2000 cycles per second. It was found that the dielectric constants of the treated and untreated materials were substantially the same at the beginning but after 35 and 118 days, respectively, the dielectric constant of the material treated at the higher of the two temperatures specified had increased less than 2 per cent after 118 days and all this increase took place in the first 35 days. The dielectric constant of the material treated at the lower of the two temperatures increased something less than 5 per cent, practically all of which took place in the first 35 days, whereas the dielectric constant of the untreated material increased 16 per cent.

The increases in specific conductances of the material treated at the higher of the two temperatures, the lower of the two temperatures and the untreated materials at the end of 118 days were 17.4 per cent, 19.1 per cent and 57.8 per cent, respectively.

So also the quantity $$\frac{G}{C}$$

(ratio of conductance to leakance) of the three materials after 118 days increased by 16.2 per cent, 13.4 per cent and 43.4 per cent, respectively.

It is to be noted that the dielectric constant of the material having the higher temperature of treatment was 2.55 after 118 days' immersion in salt solution and the quantity $$\frac{G}{C}$$

was about 32.5 after the same period of immersion.

The same samples were kept in the dark at room temperature in a 3.5 per cent sodium chloride solution and an additional 41 days in distilled water after having been weighed in the original dry condition. This constituted an accelerated water absorption test. The amount of water absorbed by the samples composed of rubber treated at 110° C. averaged 2.48 per cent; by the samples treated at 150° C. averaged 1.58 per cent and by the samples not treated averaged 6.00 per cent.

These results indicate that the treatment described made a very definite improvement in those characteristics of rubber having a bearing upon its utility and as an insulating material for use under sea water.

It will be noted that the temperature of treatment is not critical and may be varied over a considerable range and likewise the time treatment may be varied. Also small additions of other substances such as wetting agents may be made.

The present method is not limited to the use of ammonium hydroxide solutions of the exact strength specified as these may be varied to some extent. It is, however, contemplated that the ammonia concentration be high and in every case many times higher than 1 per cent; in fact, it is believed that the greater the ammonia concentration the more satisfactory will be the results obtained in a given length of time.

What is claimed is:

1. The method of treating sheet rubber to purify, deproteinize, and to improve the underwater insulating properties thereof which consists in treating the rubber under pressure at temperatures no less than 110° C. and not over 200° C. with a concentrated ammonium hydroxide solution containing not less than 15 per cent NH₃.

2. A process in accordance with claim 1, in which the ammonia solution is of a concentration not less than about 28 per cent NH₃.

3. A process in accordance with claim 1, in which the ammonia is removed from the rubber by separating the rubber from the liquid solution, immersing it in water and distilling off the residual ammonia.

ARCHIE R. KEMP.